(12) United States Patent  (10) Patent No.: US 8,531,482 B2
Blose et al.  (45) Date of Patent: Sep. 10, 2013

(54) USE OF HANDWRITTEN NOTATIONS FROM PHOTOGRAPHS

(75) Inventors: Andrew C. Blose, Penfield, NY (US); Andrew C. Gallagher, Fairport, NY (US); Joseph A. Manico, Rochester, NY (US); Charles L. Parker, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 503 days.

(21) Appl. No.: 12/823,197

(22) Filed: Jun. 25, 2010

(65) Prior Publication Data

US 2011/0316882 A1    Dec. 29, 2011

(51) Int. Cl.
*G09G 5/00* (2006.01)

(52) U.S. Cl.
USPC ........... 345/629; 345/581; 345/619; 345/636; 345/660

(58) Field of Classification Search
USPC ....................................................... 382/284
See application file for complete search history.

(56) References Cited

U.S. PATENT DOCUMENTS

| | | | |
|---|---|---|---|
| 5,307,422 A | 4/1994 | Wang | |
| 5,901,245 A | 5/1999 | Warnick et al. | |
| 6,711,291 B1 | 3/2004 | Stubler | |
| 7,072,514 B1 | 7/2006 | Thouin | |
| 7,298,920 B2 | 11/2007 | Zuniga | |
| 7,469,063 B2 * | 12/2008 | Koyama et al. | 382/187 |
| 2003/0004991 A1 * | 1/2003 | Keskar et al. | 707/512 |
| 2004/0139052 A1 * | 7/2004 | Kazushige et al. | 707/1 |
| 2007/0076980 A1 * | 4/2007 | Maeda et al. | 382/284 |
| 2007/0129887 A1 * | 6/2007 | Sakamoto et al. | 701/211 |
| 2007/0250529 A1 | 10/2007 | Beato et al. | |
| 2009/0046940 A1 * | 2/2009 | Beato et al. | 382/249 |
| 2009/0316163 A1 * | 12/2009 | Hanawa | 358/1.6 |
| 2010/0033741 A1 * | 2/2010 | Kido et al. | 358/1.9 |
| 2010/0033742 A1 * | 2/2010 | Hanawa | 358/1.9 |

OTHER PUBLICATIONS

Gonzalez et al, Digital Image Processing, Prentice Hall, 2002, pp. 567-626.

* cited by examiner

*Primary Examiner* — Phi Hoang
(74) *Attorney, Agent, or Firm* — Raymond L. Owens

(57) ABSTRACT

A method for detecting, scaling, and positioning handwritten information from hardcopy media, the method includes the steps of digitizing the media and detecting handwritten information; analyzing the media to determine an available location in the digitized image for placement; determining the orientation of the media and handwritten information; and orienting, scaling, and positioning the detected handwritten information. The method further includes storing or using the digitized image side with the handwritten information.

6 Claims, 7 Drawing Sheets

USE OF HANDWRITTEN NOTATIONS FROM PHOTOGRAPHS

FIELD OF THE INVENTION

This invention relates to scanning hardcopy media to acquire digital versions of images and handwritten notations and combining these records into ornamental versions of the original hardcopy content.

BACKGROUND OF THE INVENTION

Many photographs contain handwritten information in addition to the image information. Often this handwritten information is highly useful, interesting, emotional, or has historic significance. In some cases the handwritten notation associated with the print can be more interesting or emotionally valuable than the image itself. In addition the handwritten notation provides a personal narrative context for the image. It is often desirable to make copies of these photographs to create replica prints. The front and back of loose photographic prints and photo album pages can be scanned to obtain digital records of images and handwritten notations which can appear on either surface of the photographic print. Additionally album pages can include individual photographic prints that have been mounted to a backing sheet page which is often used to write handwritten notations that are positioned relative to the mounted photographic print. Once these digital records are obtained they can be used to create new image products such as reprints, bound photo albums, postcards, greeting card, mugs, t-shirts, videos, movies, animations, slide shows and the like.

Existing document scanning devices such as the Kodak i1220 and i1440 can simultaneously scan both sides of a photograph conveniently providing content from each side in digital form. These scanners are capable of scanning large numbers of prints which enables users to scan large quantities of photographs which in turn creates a multitude of digital files. In addition flatbed scanners such as Kodak A4 Tethered Flatbed and copy stands equipped with digital cameras can also be used to capture digital records of photo album pages and large collages made up of multiple individual photographs and handwritten notations which have been mounted to a support sheet of page.

Prior Art techniques such as described by Beato et al in U.S. Patent Application Publication No. 20090046940A1 are related. Beato et al describe the existence of "consumer marks" on the non-image side of a print and is shown in FIG. 6B. It teaches the use of optical character recognition to create an annotation on the front side of the image shown in FIG. 7B. The method taught in Beato et al produces artificially rendered text in the image and does not preserve the original handwritten information. The most relevant example is presented in FIG. 7C and illustration of a panoramic image that consists of the front side and non-image (back) side of a photographic postcard. The non-image side is shown in its "raw" form. The need to determine the proper orientation of the handwritten information for this type of display is not disclosed in Beato et al. Other methods of displaying consumer marks are disclosed such as "picture-in-picture" and "see-through" but details of these methods are not provided. As with the panoramic display, this application does not describe a need to determine proper orientation or scaling of the handwritten information.

It is known from U.S. Pat. Nos. 5,901,245 and 6,711,291 that open spaces in digital images can be detected. Both patents disclose methods for determining regions of images that are suitable for the placement and overlay of other image content without obscuring more interesting regions of the image. U.S. Pat. No. 6,711,291 goes further to describe a method of placing human understandable items, such as handwritten information, to minimally obscure important content in the image. U.S. Pat. No. 6,711,291, does not address determining the proper orientation or size of the human understandable content.

Methods in the prior art lacking orientation, scaling and positioning produce practical embodiments that will produce displays of hard-copy media that have image side content obscured by improperly placed and sized handwritten information often in the wrong orientation.

SUMMARY OF THE INVENTION

The above-described problem(s) is/are addressed and a technical solution is achieved in the art by a system and a method for detecting and correctly positioning handwritten information from a hard copy medium onto digital image content according to the present invention. In one embodiment of the invention a method is described for detecting, scaling and positioning handwritten information from a hardcopy medium having an image and non-image side, comprising:
  (a) using an image capture device to digitize the image side and the non-image side of the hardcopy medium to detect handwritten information;
  (b) analyzing the digitized image side of the hardcopy medium to determine an available location in the digitized image to place the handwritten information;
  (c) using a processor to analyze the handwritten information or the digitized image side or both to determine the orientation of the handwritten information and the digitized image side;
  (d) analyzing the handwritten information or the available location or both to determine the scale of the handwritten information and the digitized image side;
  (e) orienting, scaling and positioning the handwritten information into the available location consistent with the determined orientation of the handwritten information and the orientation of the digitized image side, and the scale; and
  (f) storing or using the digitized image side with the handwritten information.

According to another embodiment of the present invention, there can be multiple detected handwritten information segments on either the image or non-image side of the hardcopy medium or both and the invention will determine an available location for each detected handwritten information segment. The handwritten information segments can then be selected based on the area of the information, the color of the handwritten information, or the assessed quality of the handwritten information.

According to another embodiment of the present invention, the tone scale of the image side of the hardcopy medium can be analyzed and the detection handwritten information content can be adjusted in accordance with the analyzed tone scale of the image side. The adjustment of the handwritten information can include the modification of the color of the handwritten information.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION OF THE INVENTION

The present invention discloses a method and system that automatically detects and scales, orients, and positions handwritten information found by scanning hardcopy media.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

The phrase, "digital content record", as used herein, refers to any digital content record, such as a digital still image, a digital audio file, or a digital video file.

It should be noted that, unless otherwise explicitly noted or required by context, the word "or" is used in this disclosure in a non-exclusive sense.

Figure 1:
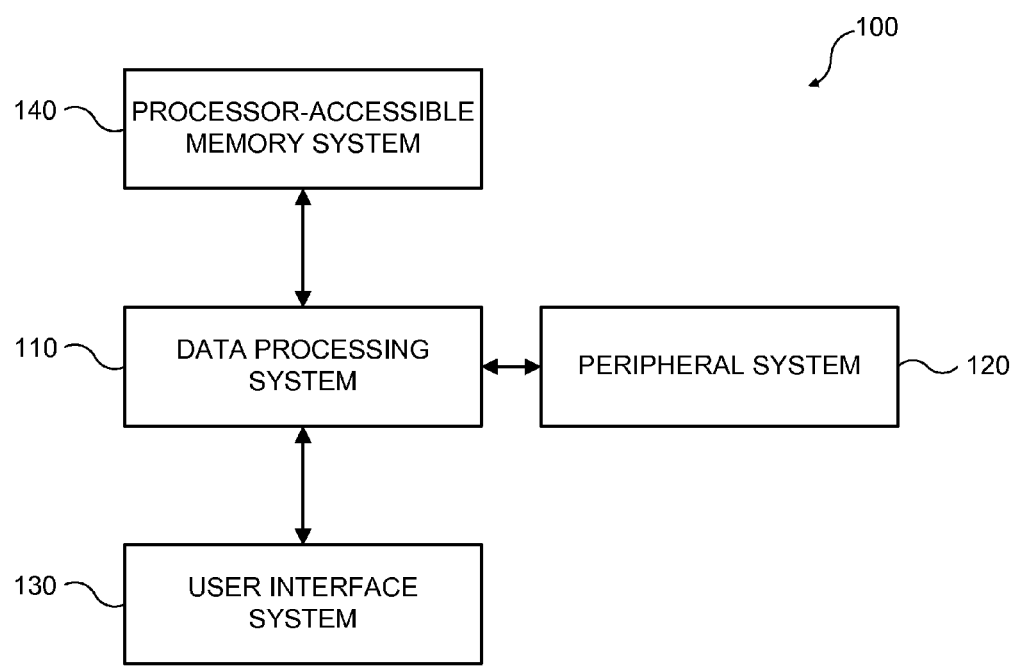
FIG. 1 illustrates a system for practicing the various methods of detecting and positioning handwritten information from hardcopy media, according to an embodiment of the present invention.

FIG. 1 illustrates a system 100 for detecting, scaling and positioning handwritten information from a hardcopy medium, according to an embodiment of the present invention. The system 100 includes a data processing system 110, a peripheral system 120, a user interface system 130, and a processor-accessible memory system 140. The processor-accessible memory system 140, the peripheral system 120, and the user interface system 130 are communicatively connected to the data processing system 110.

Figure 2:
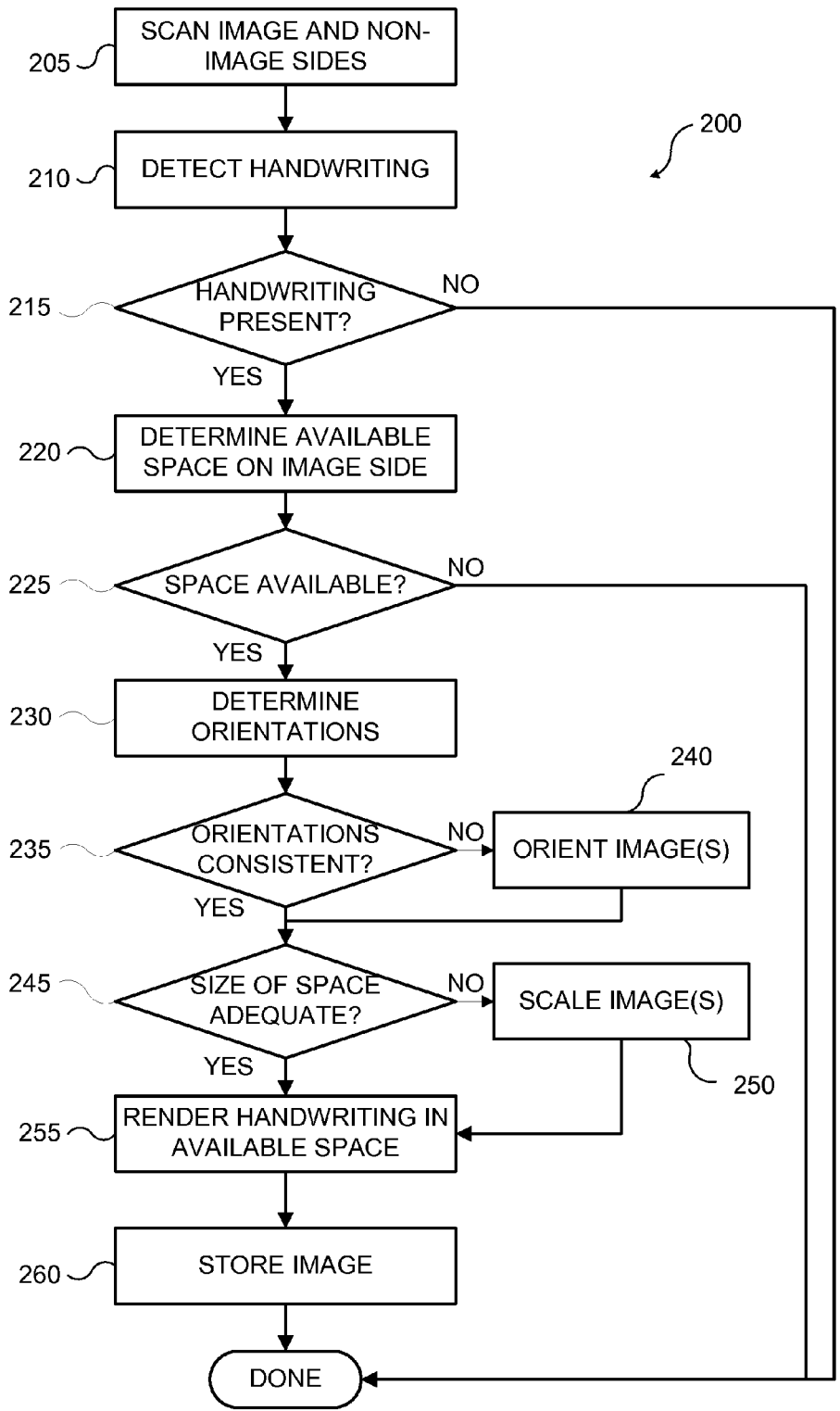
FIG. 2 illustrates a method for practicing the various methods of detecting and positioning handwritten information from hardcopy media, according to an embodiment of the present invention.

The data processing system 110 includes one or more data processing devices that implement the processes of the various embodiments of the present invention, including the example process of FIG. 2 described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The processor-accessible memory system 140 includes one or more processor-accessible memories configured to store information, including the information needed to execute the processes of the various embodiments of the present invention, including the example process of FIG. 2 described herein. The processor-accessible memory system 140 can be a distributed processor-accessible memory system including multiple processor-accessible memories communicatively connected to the data processing system 110 via a plurality of computers or devices. On the other hand, the processor-accessible memory system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. Further, the phrase "communicatively connected" is intended to include a connection between devices or programs within a single data processor, a connection between devices or programs located in different data processors, and a connection between devices not located in data processors at all. In this regard, although the processor-accessible memory system 140 is shown separately from the data processing system 110, one skilled in the art will appreciate that the processor-accessible memory system 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide digital content records to the data processing system 110. For example, the peripheral system 120 can include digital video cameras, cellular phones, regular digital cameras, or other data processors. The data processing system 110, upon receipt of digital content records from a device in the peripheral system 120, can store such digital content records in the processor-accessible memory system 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory can be part of the processor-accessible memory system 140 even though the user interface system 130 and the processor-accessible memory system 140 are shown separately in FIG. 1.

Figure 3A:
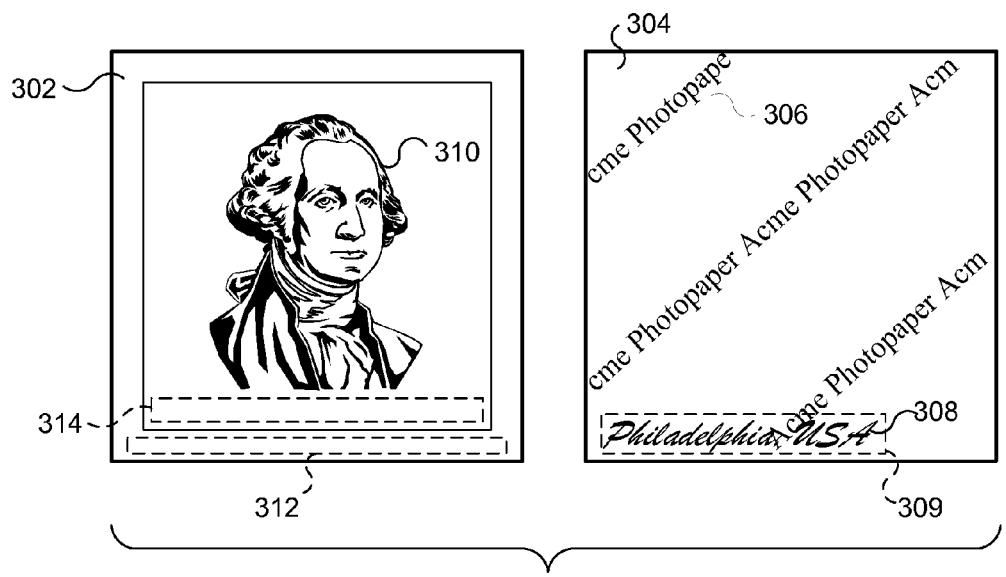
FIG. 3A illustrates the scanned front and back sides of a hardcopy medium processed in an embodiment of the present invention.
Figure 6:
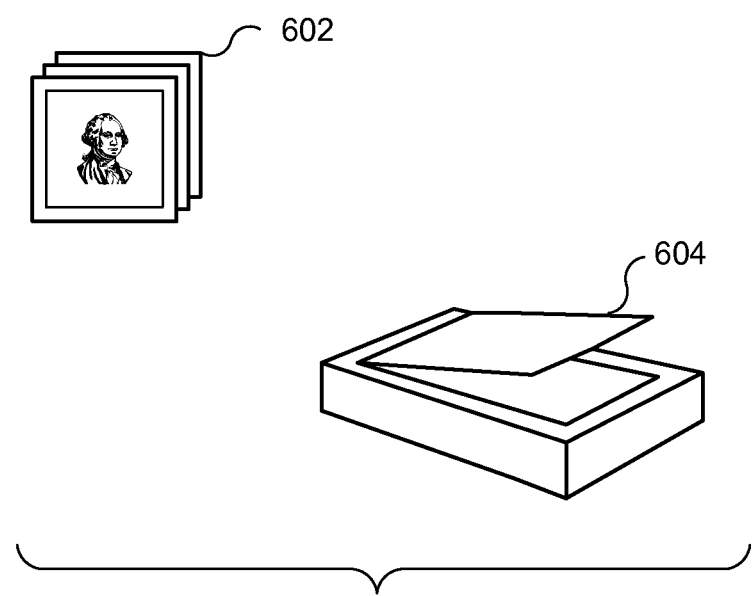
FIG. 6 illustrates a practical example upon which the methods of FIGS. 2 and 4 are executed, according to an embodiment of the present invention.

FIG. 2 illustrates a method 200 for detecting and correctly positioning handwritten information from a hardcopy medium, according to an embodiment of the present invention. The present invention will now be described with reference to FIG. 2 and FIG. 6. There is shown a flow diagram 200 illustrating how handwritten information from hardcopy medium is detected and positioned. There is also shown a diagram of a practical example of an embodiment of the present invention. Access to digital images of the front and back sides of a hardcopy medium are obtained in step 205 by scanning each side of hardcopy media 602 with a scanner 604 to acquire a digitized image side of each hardcopy medium 602 and a digitized non-image side of each hardcopy medium 602. In step 210 the digital images of the image and non-image sides obtained in step 205 are processed to detect handwritten information. A method for detecting handwritten information and machine printing and the area they occupy (bounding box) is disclosed in U.S. Pat. No. 7,072,514. Referring to FIG. 3A, there is shown a digitized image side 302 and a digitized non-image side 304 of hardcopy media 602. On the back side both machine printing 306 and handwritten information 308 are shown. Handwritten information detection methods detect handwritten information 308 and identify a bounding box 309. Referring back to FIG. 2, if handwritten information is not detected in step 210, NO for decision box 215, the process is terminated. If handwritten information is detected, YES for decision box 215, step 220 is performed to determine if there is available open space on the digitized image side 302. A method for determining an appropriate open space in an image for text placement is disclosed in U.S. Pat. No. 6,711,291. Referring to FIG. 3A, open spaces 312 and 314 are shown as well as non-open space 310. It is possible that many open spaces are identified and a suitable space is selected based on a user preference. If available space is not identified in step 220, NO for decision box 225, the process is terminated. If available space is identified, YES for decision box 225, step 230 is performed to determine the orientations of the digitized image side 302 and the digitized non-image side 304.

Figure 4:
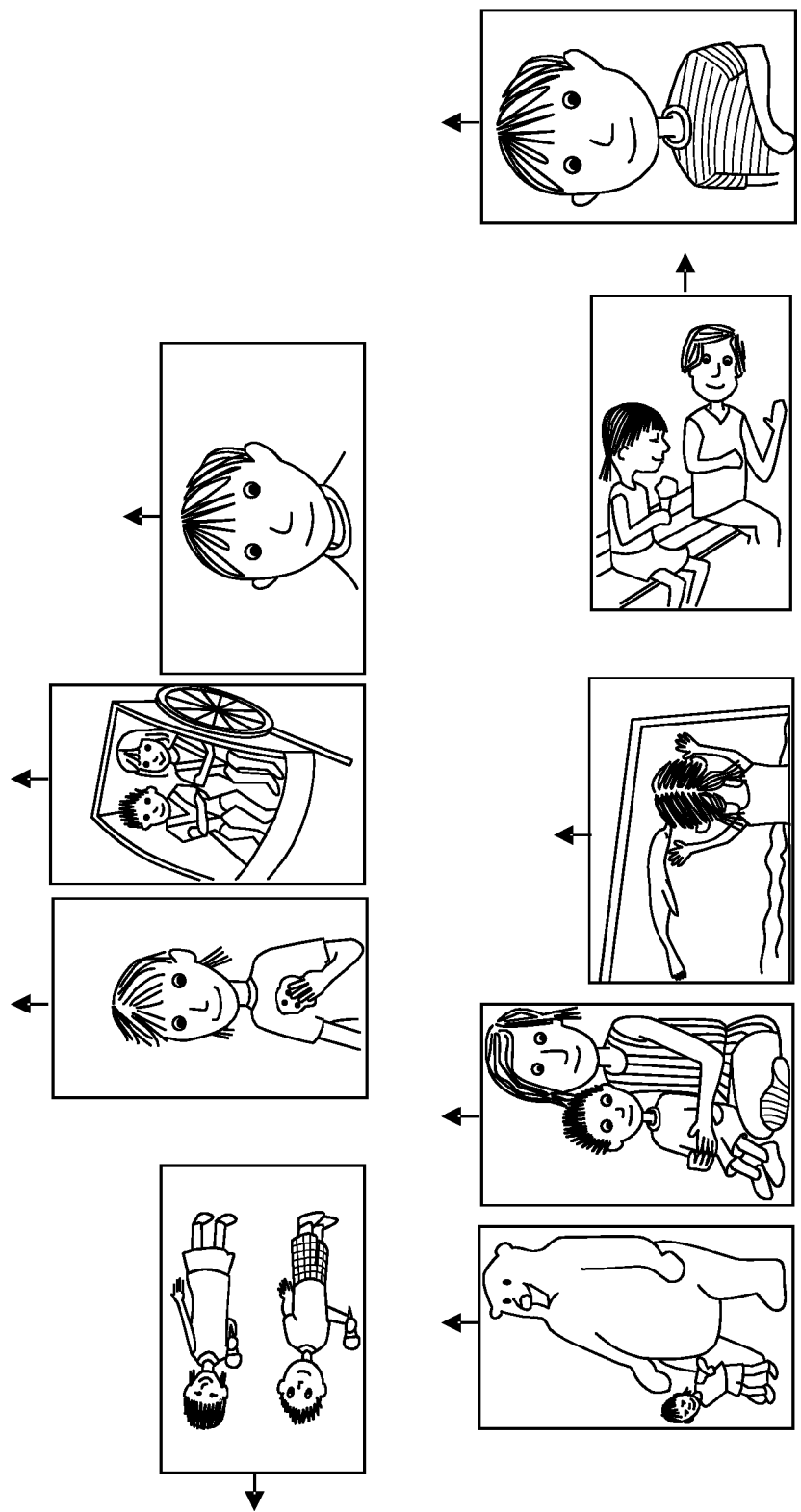
FIG. 4 illustrates the detected orientation of several hardcopy media.

In the preferred embodiment, the orientation of both the digital images of the image side and the handwritten information are found. In this description, "orientation" refers to an indication of the direction that is "up" in the image or handwritten information. Determining the orientation of a digitized image side 302 of the hardcopy medium 602 is described in U.S. Patent Application Publication No. 20070250529. The orientation of the digitized image side 302 can be found by analyzing the image content; for example, blue skies are often found on the top of an image, and faces are typically oriented in alignment with the image (the top of the face corresponds to the top of the image). In some cases, the configuration of the scanner 604 ensures that the operator will insert the hardcopy medium 602 in a manner so that the orientation is known (e.g. the "up" side of the hardcopy medium 602 is always inserted into the scanner 604). FIG. 4 illustrates the detected orientation of several images and shows the result of the step 230 for determining orientation with an arrow indicating the top of the digitized image.

Figure 5:
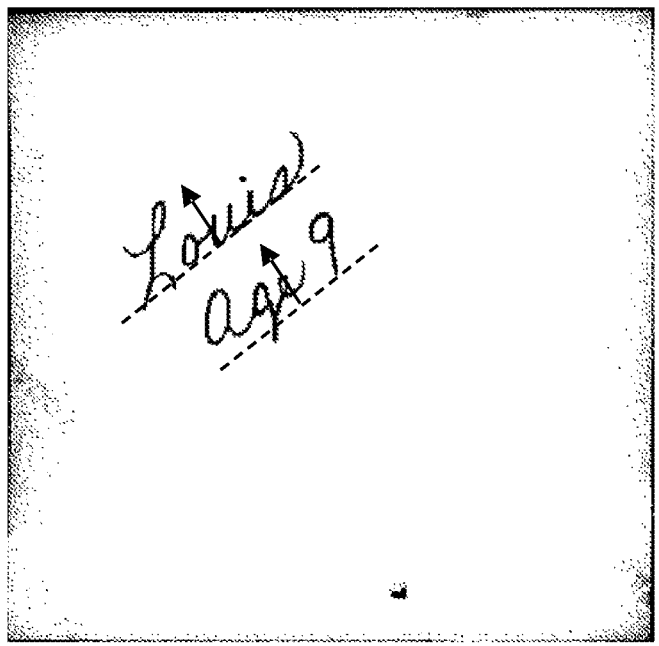
FIG. 5 illustrates an example of handwritten information on the back of two hardcopy media.
Figure 5:
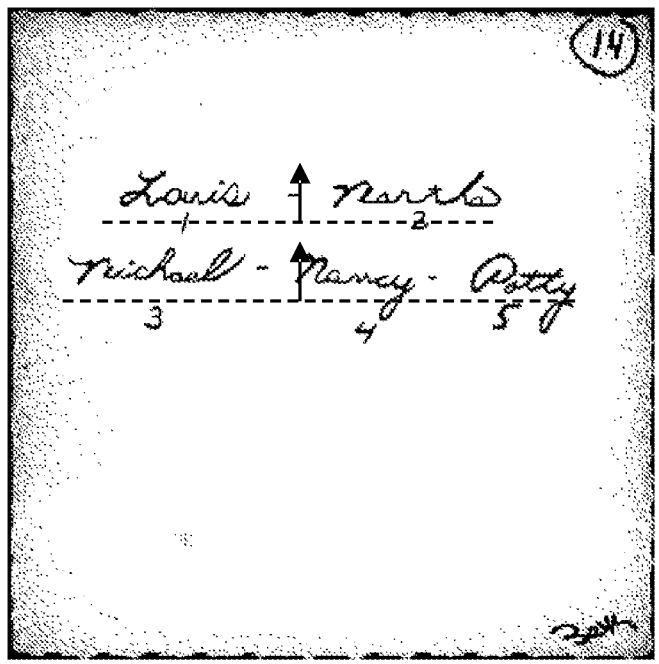

The orientation of detected handwritten information 308 is also determined to define the top ("up" direction) of the handwritten information. This is accomplished as follows. First, lines of text are found in the handwritten information using any method known in the art. For example, the lines of text are usually parallel to the longer axis of bounding box that surrounds the handwritten information 308. Further, the lines of text can be identified with a method such as described in U.S. Pat. No. 5,307,422. Next, the orientations of the lines of text are determined. For example, the text orientation estimation described by U.S. Pat. No. 7,298,920 can be used. In general, the orientation of text is orthogonal to the direction of the lines of text, so given a line of handwritten information; the orientation of the handwritten information 308 is either "up" or "down". This is accomplished by recognizing that most characters of handwritten text are "bottom heavy". Each line of text in the handwritten information 308 is integrated along the direction of the line of text to create a line profile. The line profile is analyzed to determine the center of mass of the handwritten information and possibly other features (e.g. the mean, the median, and the peak of mass). A classifier is then used to classify the line of handwritten text for its orientation. In the case where multiple lines of text appear near each other, then each line of text is analyzed as described and another classifier is used to determine the overall orientation of the handwritten text block based on the analysis of the line profiles of each line of handwritten text or the classified orientation of each line of handwritten text. FIG. 5 shows example handwritten information on the back of two hardcopy media 602. Each line of handwritten information is shown with a dashed line, and the orientation of the handwritten information is indicated with an arrow.

Figure 3B:
FIG. 3B illustrates the processed scanned front side of a hardcopy medium.
Figure 3C:
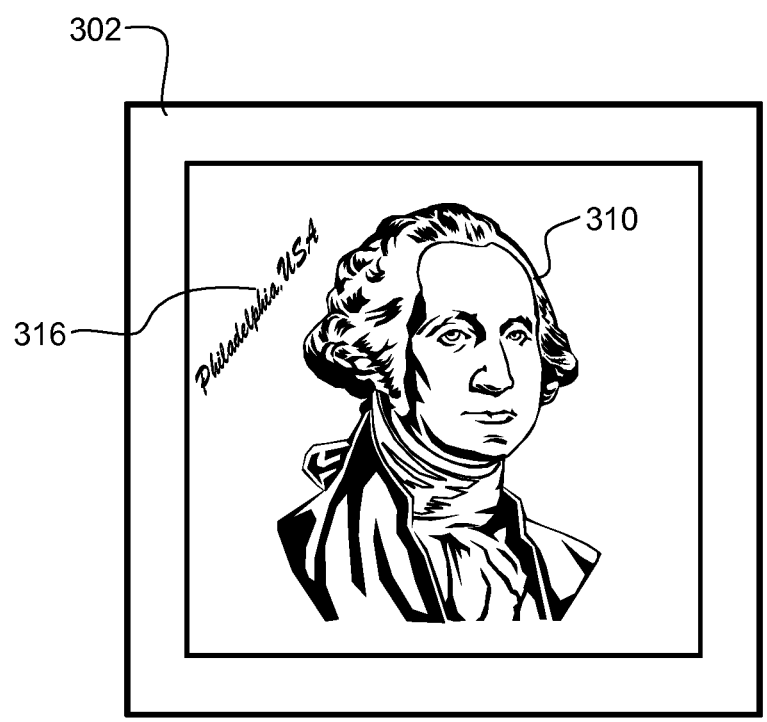
FIG. 3C illustrates the processed scanned front side of a hardcopy medium with text in an unaligned orientation.

Referring back to FIG. 2, if the orientations of the digitized image side 302 and handwritten information 308 determined in step 230 are not the same, NO to decision box 235, step 240 is performed to align the orientations by rotating the digitized image side 302 or the digitized handwritten information 308. In some embodiments, the rotations of either the digitized image side 302 or the handwritten information 308 is performed in multiples of 90 degrees. Preferably, the result of step 230 is that the orientations of the digital image side 302 and the handwritten information 308 is the same. This permits the resulting handwritten information 308 and the digital image side 302 to be combined, such as illustrated in FIG. 3B, where a combined digital image side 302 is produced by combining the image of handwritten information 316 and the digitized image side 310 where both the handwritten information 316 and the digitized image side 302 have the same orientation. In another embodiment, illustrated in FIG. 3C, for visual variety, the image of the handwritten information 316 is orientated so that it is not aligned with the orientation of the digitized image side 302, but rather is rotated to be about 45 degrees from orientation of the digitized image side 302. In this embodiment, it has been found that either the digitized image side 302 or the image of the handwritten information 316 or both are preferably rotated so that their orientations are within 90 degrees of each other. The angle referring to the angle produced by the vector that indicates the orientation of the digitized image side 302 and the vector that indicates the orientation of the image of the handwritten information 316.

Once aligned, YES to decision box 235, the size of the bounding box 309 around the handwritten information 316 is compared to the open spaces 312 and 314 identified in step 220. If a large enough open space does not exist, NO to decision box 245, the digitized image side 302 or the area of the digitized non-image side 304 image in the bounding box 309 is scaled in step 250. Any common image scaling technique known to one skilled in the art can be used. Once the open space 312 is large enough to accommodate the bounding box 309, YES to decision box 245, step 255 is performed to render the handwritten information 308 in open space 312. The image content of the entire bounding box 309 can be copied into the open space 312 in simple implementations. More aesthetically pleasing results can be achieved by performing foreground and background segmentation on the bounding box 309 content. Many image segmentation methods exist and some suitable methods are described in the published book Digital Image Processing, $2^{nd}$ Edition, by Rafael C. Gonzalez and Richard E. Woods, pp. 567-626. Once the foreground handwritten information 308 pixels are segmented, they can be copied into the bounding box 309 content preserving the original bounding box background. Referring to FIG. 3B, once the handwritten information is rendered into the digitized image side 302, handwritten information 316 now contains the handwritten information 308. The image is stored for later use in step 260 and the process is complete.

In some embodiments, there are multiple detected handwritten information segments on either the image or non-image side of the hardcopy medium or both. In this case, the process described herein above is repeated for each detected handwritten information segment, taking care to prevent overlap in the handwritten information 308 when it is combined with the digitized image side 302.

In another embodiment, the tonal characteristics of the digitized handwritten information 308 are modified in accordance with an analysis of the tonal characteristics of the digitized image side of the hardcopy medium 602. This procedure results in the production of an image made by combining handwritten information 308 and the digitized image side 302 that is visually pleasing and harmonious. For example, if the analysis of the digitized image side 302 reveals that the digitized image side 302 is grayscale (i.e. a black-and-white image), then the handwritten information 308 is processed to desaturate it and make the handwritten information 308 grayscale as well. Further, a look-up-table (LUT) or balance adjustment can be applied to the handwritten information 308 to better match the appearance of the digitized image side 302. For example, if the digitized image side 302 is a sepia-tone image, and the handwritten information 308 was written with a green pen, then the handwritten information 308 is adjusted by way of a LUT to have a sepia-tone appearance. This process can be accomplished by finding dominant colors in the digitized image side 302, and producing a LUT or color transformation table to map the colors of the handwritten information 308 to the colors of the digitized image side 302.

As previously mentioned, in some embodiments, there are multiple detected handwritten information segments on either the image or non-image side of the hardcopy medium 602 or both. It can be desirable to select only one or some of the detected handwritten information segment from the plurality of segments. The selection can be based on the area of the handwritten information 308. For example, the handwritten information 308 with the largest area can be preferred since it presumably contains more interesting content than smaller areas. The selection can also be made based on the color of the handwritten information pixels. For example, the handwritten information 308 with the color that most closely matches the tonal characteristics of the digitized image side of the hardcopy medium 602. The selection can also be based on quality of the handwritten information 308. For example, the handwritten information 308 with the highest contrast between the segmented foreground handwritten information pixels and the background handwritten information pixels can be selected since it presumably is more legible.

It is to be understood that the exemplary embodiment(s) is/are merely illustrative of the present invention and that many variations of the above-described embodiment(s) can be devised by one skilled in the art without departing from the scope of the invention. It is therefore intended that such variations be included within the scope of the following claims and their equivalents.

PARTS LIST

100 System
110 Data Processing System
120 Peripheral System
130 User Interface System
140 Processor-Accessible Memory System
200 Method
205 Step
210 Step
215 Decision Box
220 Step
225 Decision Box
230 Step
235 Decision Box
240 Step
245 Decision Box
250 Step
255 Step
260 Step
302 Digitized Image Side
304 Digitized Non-Image Side
306 Machine Printing
308 Handwritten Information
309 Bounding Box
310 Non-Open Space
312 Open Space
314 Open Space
316 Handwritten Information
602 Hardcopy Media
604 Scanner

The invention claimed is:

1. A method for detecting, scaling and positioning handwritten information from a hardcopy medium having an image and non-image side, comprising:
   (a) using an image capture device to digitize the image side and the non-image side of the hardcopy medium to detect handwritten information;
   (b) analyzing the digitized image side of the hardcopy medium to determine an available location in the digitized image to place the handwritten information;
   (c) using a processor to analyze the handwritten information and the digitized image side to determine the orientation of the handwritten information and the digitized image side;
   (d) analyzing the handwritten information and the available location to determine the scale of the handwritten information and the digitized image side;
   (e) orienting, scaling and positioning the handwritten information into the available location consistent with the determined orientation of the handwritten information and the orientation of the digitized image side, and the scale; and
   (f) storing or using the digitized image side with the handwritten information.

2. The method of claim 1 wherein there are multiple detections of handwritten information on either the image or non-image side of the hardcopy medium or both and one or more detections of handwritten information are used in steps (b)-(f) to store one or more detections of handwritten information with the digitized image side.

3. The method of claim 2 further including selecting at least one of the multiple detections of handwritten information for use in steps (b)-(f).

4. The method of claim 3 wherein selecting at least one of the multiple detections of handwritten information includes using the area, text color, or handwriting quality features.

5. The method of claim 1, wherein step (f) further includes:
   (i) analyzing the tone scale of the digital image side; and
   (ii) processing the appearance of the handwritten information in accordance with the tone scale of the digital image side.

6. The method of claim 5, wherein processing the appearance of the handwritten information includes changing the color of the handwritten information.

* * * * *